(12) United States Patent
Hanawa et al.

(10) Patent No.: US 6,975,107 B2
(45) Date of Patent: Dec. 13, 2005

(54) EDDY CURRENT SENSING OF METAL REMOVAL FOR CHEMICAL MECHANICAL POLISHING

(75) Inventors: Hiroji Hanawa, Sunnyvale, CA (US); Nils Johansson, Los Gatos, CA (US); Boguslaw Swedek, San Jose, CA (US); Manoocher Birang, Los Gatos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 10/446,367

(22) Filed: May 27, 2003

(65) Prior Publication Data

US 2003/0201769 A1 Oct. 30, 2003

Related U.S. Application Data

(62) Division of application No. 09/574,008, filed on May 19, 2000, now Pat. No. 6,924,641.

(51) Int. Cl.$^7$ ............................................. G01N 27/90
(52) U.S. Cl. ........................................................ 324/230
(58) Field of Search ................................. 324/229, 230, 324/233, 234, 239, 207.16, 207.26, 71.5

(56) References Cited

U.S. PATENT DOCUMENTS

| | | | |
|---|---|---|---|
| 4,005,359 A | 1/1977 | Smoot | |
| 4,112,365 A | 9/1978 | Larson et al. | |
| 4,303,885 A | 12/1981 | Davis et al. | |
| 4,467,281 A | 8/1984 | Davis et al. | |
| 4,556,845 A | 12/1985 | Strope et al. | |
| 4,715,007 A | 12/1987 | Fujita et al. | |
| 4,716,366 A | 12/1987 | Hosoe et al. | |
| 4,829,251 A | 5/1989 | Fischer | |
| 5,003,262 A | 3/1991 | Egner et al. | |
| 5,213,655 A | 5/1993 | Leach et al. | |
| 5,237,271 A | 8/1993 | Hedengren | |
| 5,343,146 A | 8/1994 | Koch et al. | |
| 5,355,083 A | 10/1994 | George et al. | |
| 5,433,651 A | 7/1995 | Lustig et al. | |
| 5,541,510 A | 7/1996 | Danielson | |
| 5,559,428 A | 9/1996 | Li et al. | |
| 5,644,221 A | 7/1997 | Li et al. | |
| 5,660,672 A | 8/1997 | Li et al. | |
| RE35,703 E | 12/1997 | Koch et al. | |
| 5,731,697 A | 3/1998 | Li et al. | |
| 5,893,796 A | 4/1999 | Birang et al. | |
| 6,004,187 A * | 12/1999 | Nyui et al. ..................... | 451/5 |
| 6,068,539 A | 5/2000 | Bajaj et al. | |
| 6,309,276 B1 * | 10/2001 | Tsai et al. ..................... | 451/5 |
| 6,558,229 B2 | 5/2003 | Kimura et al. | |
| 6,707,540 B1 | 3/2004 | Lehman et al. | |
| 2002/0077031 A1 | 6/2002 | Johansson et al. | |

FOREIGN PATENT DOCUMENTS

WO        01/46684 A1    6/2001

\* cited by examiner

*Primary Examiner*—Bot Ledynh
*Assistant Examiner*—Reena Aurora
(74) *Attorney, Agent, or Firm*—Fish & Richardson

(57) ABSTRACT

A sensor for monitoring a conductive film in a substrate during chemical mechanical polishing generates an alternating magnetic field that impinges a substrate and induces eddy currents. The sensor can have a core, a first coil wound around a first portion of the core and a second coil wound around a second portion of the core. The sensor can be positioned on a side of the polishing surface opposite the substrate. The sensor can detect a phase difference between a drive signal and a measured signal.

14 Claims, 9 Drawing Sheets

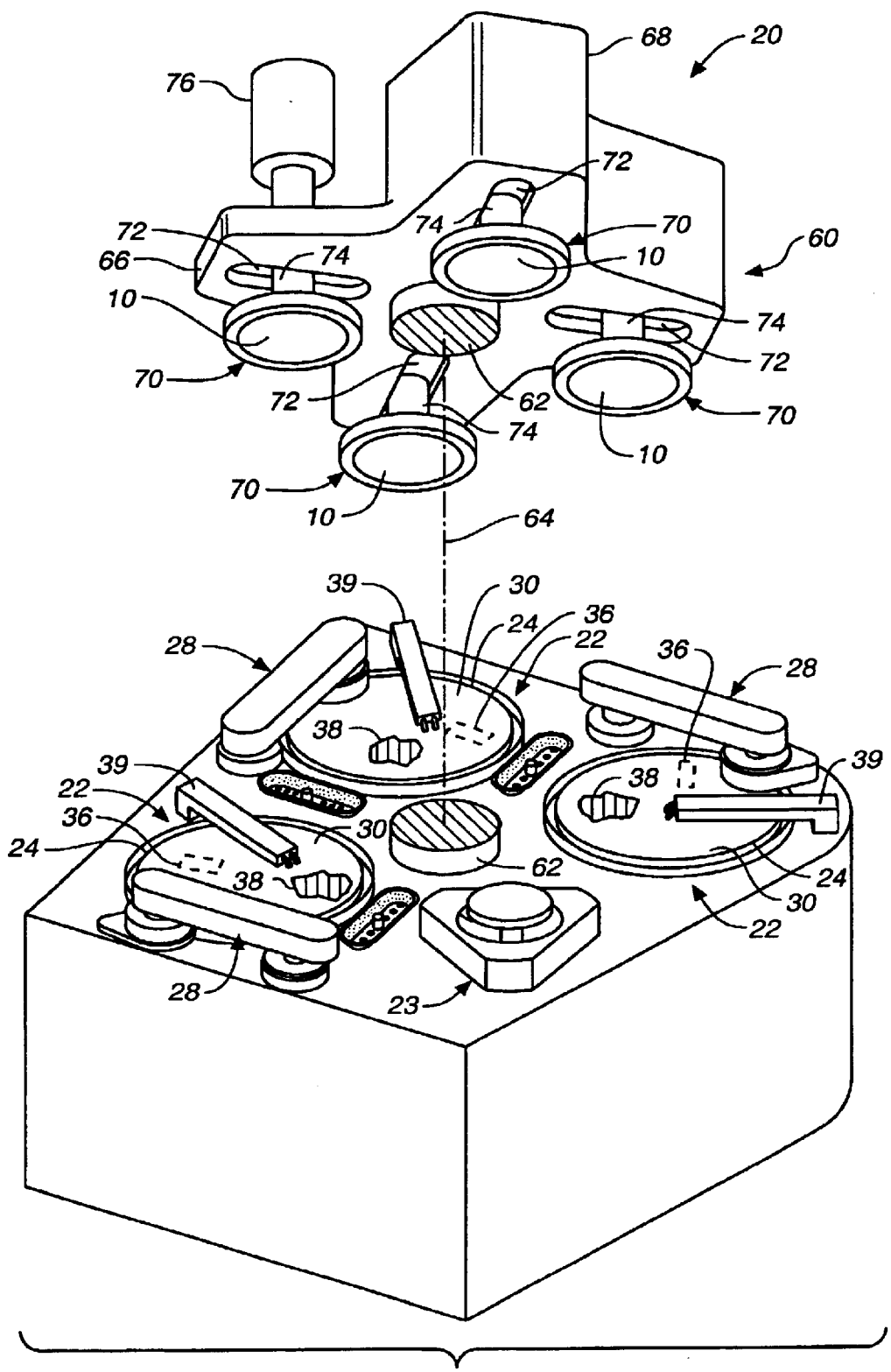
FIG._1

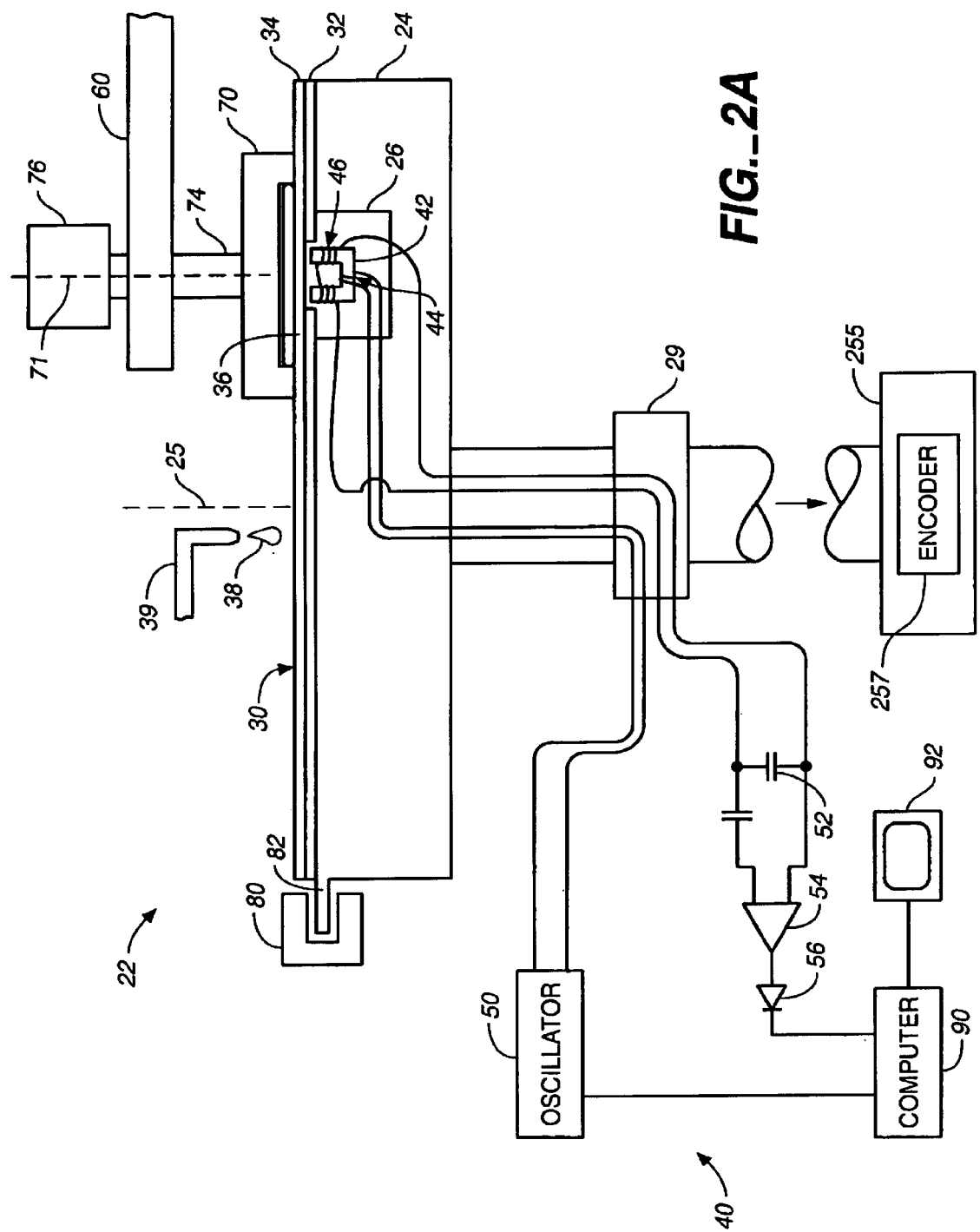
FIG._2A

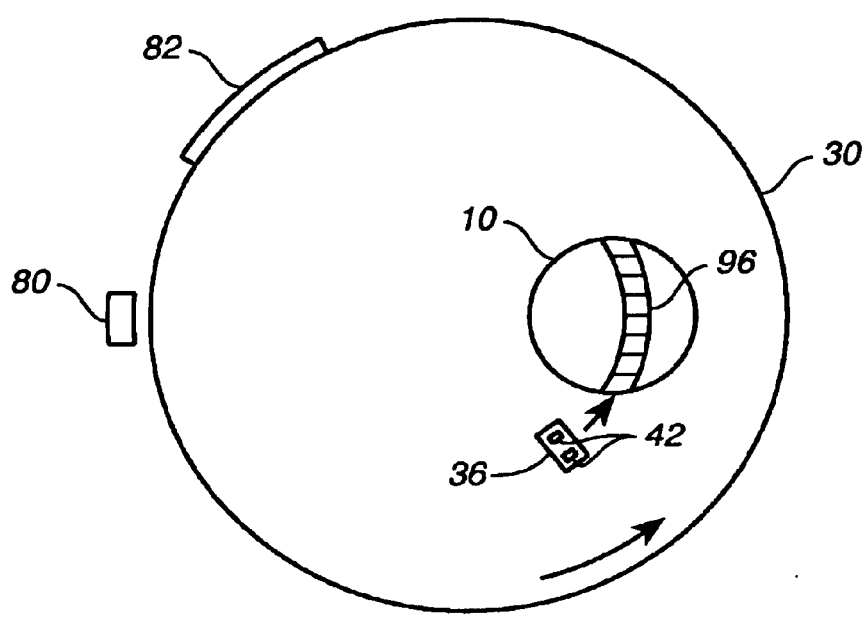
FIG._2B
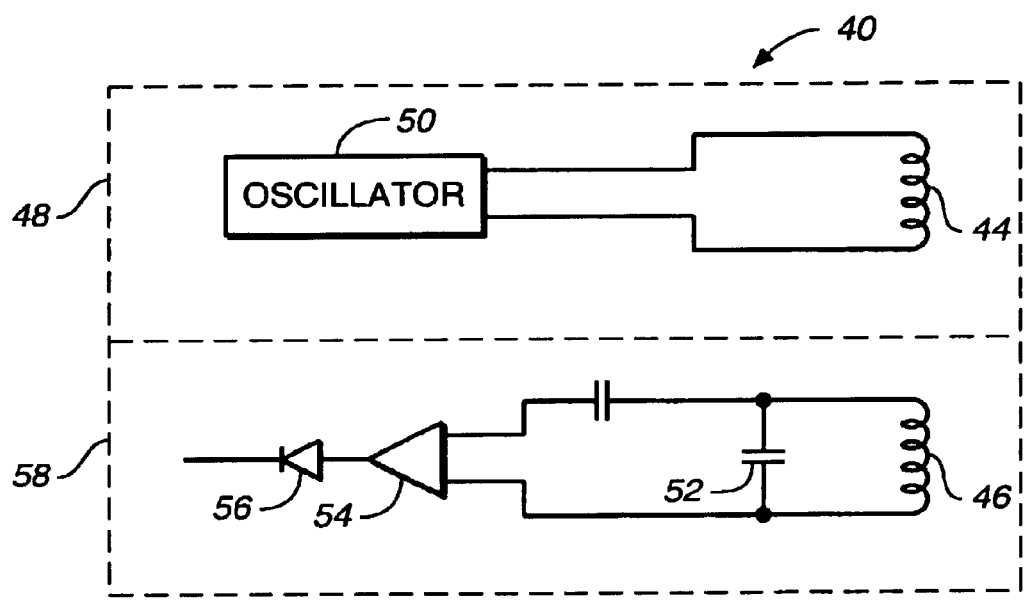
FIG._3

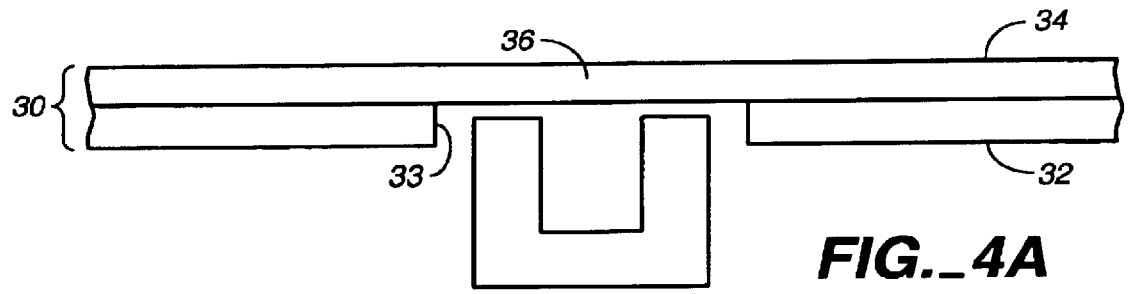
FIG._4A
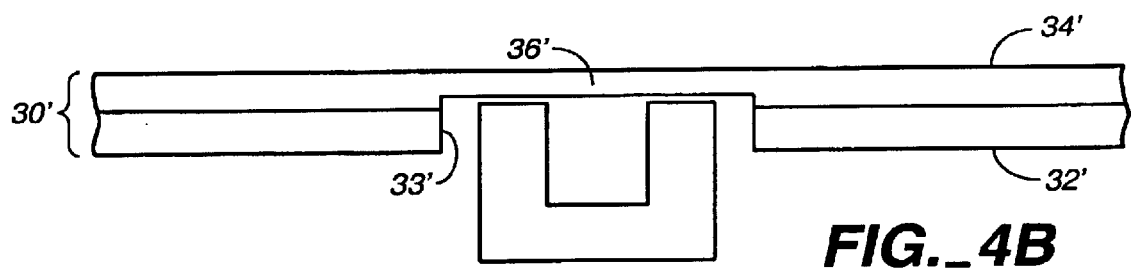
FIG._4B
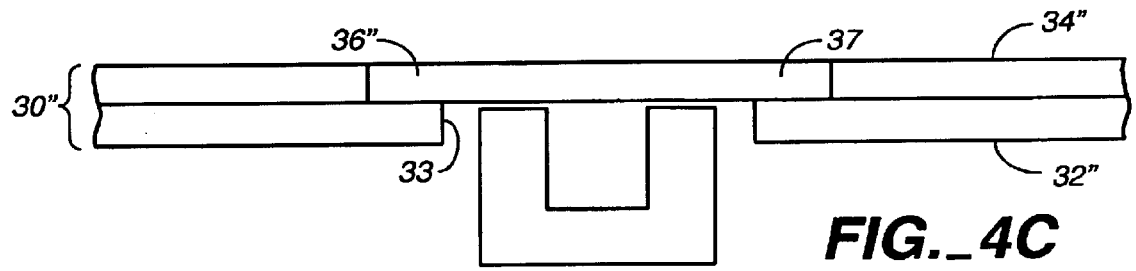
FIG._4C

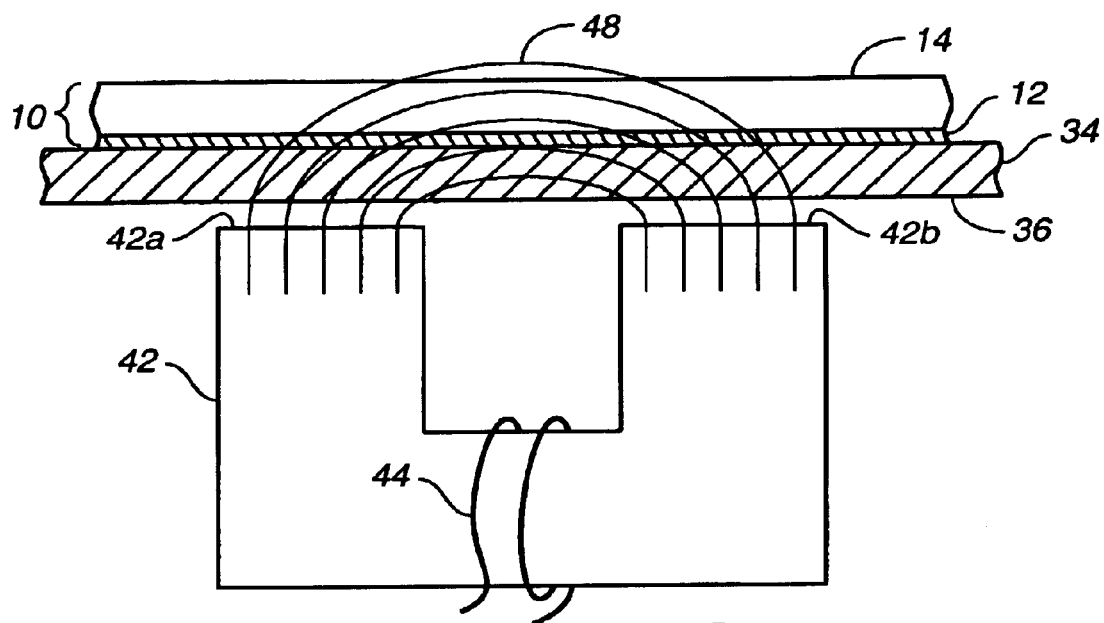
FIG._5
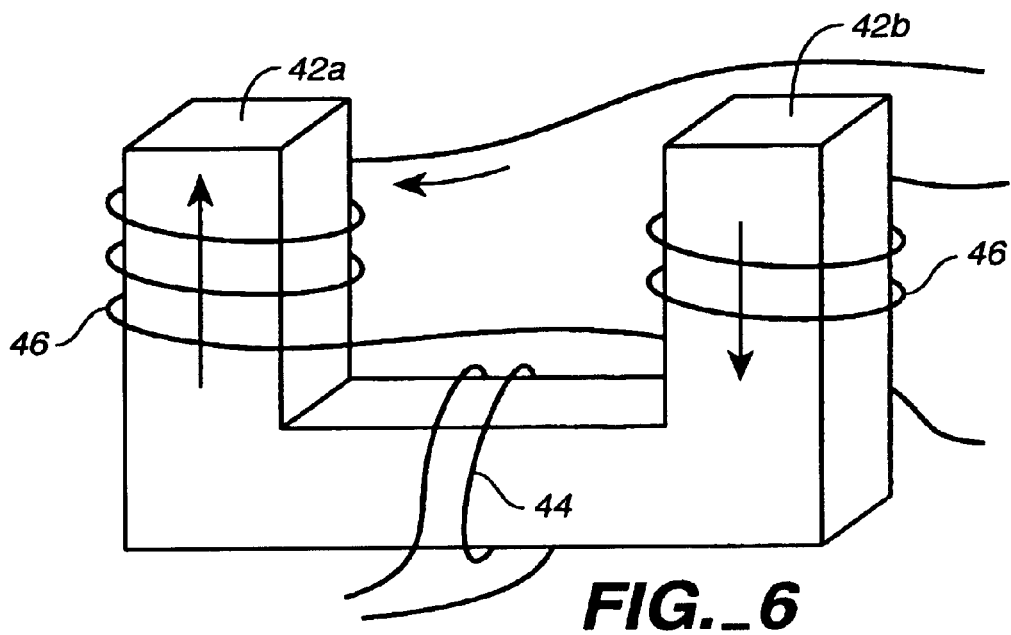
FIG._6

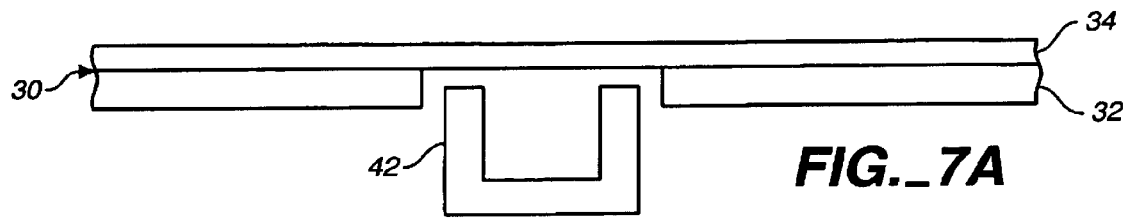
FIG._7A
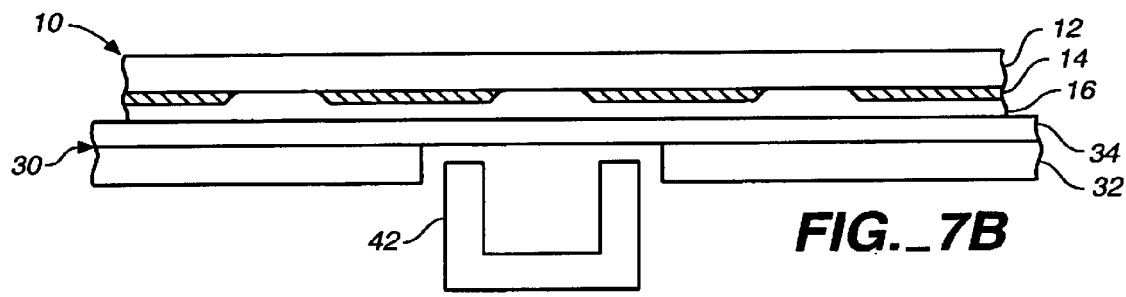
FIG._7B
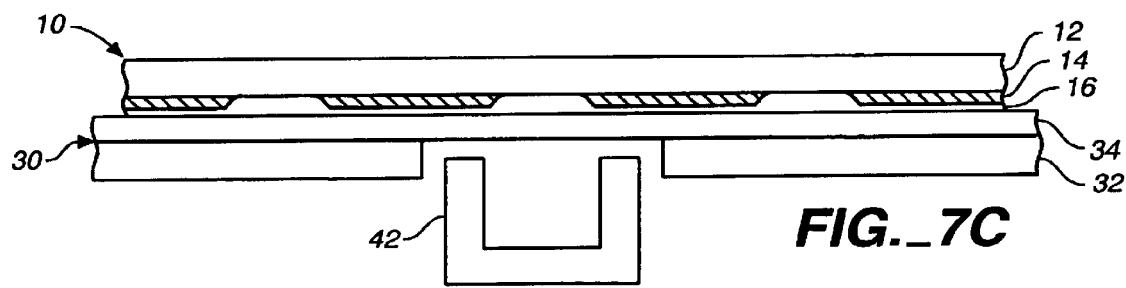
FIG._7C
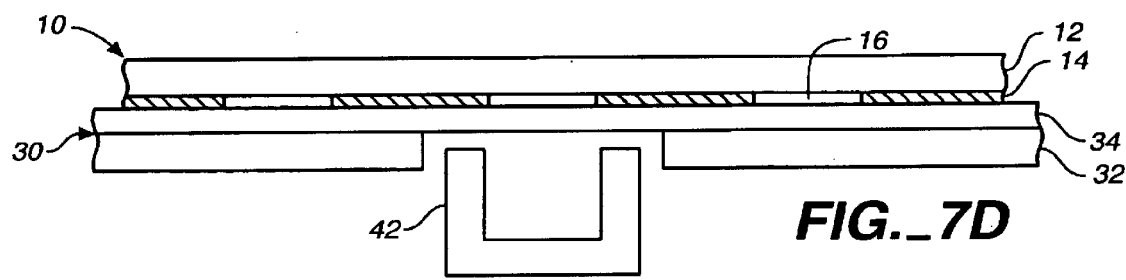
FIG._7D

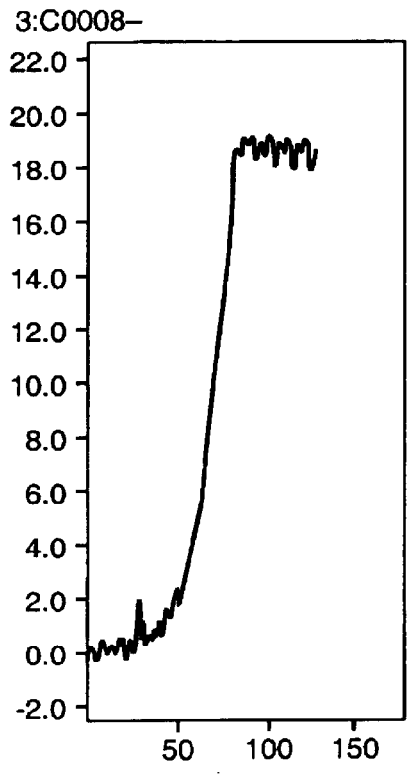
FIG._8
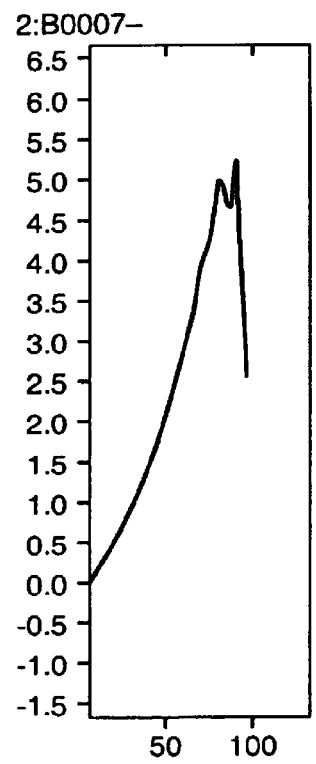
FIG._11
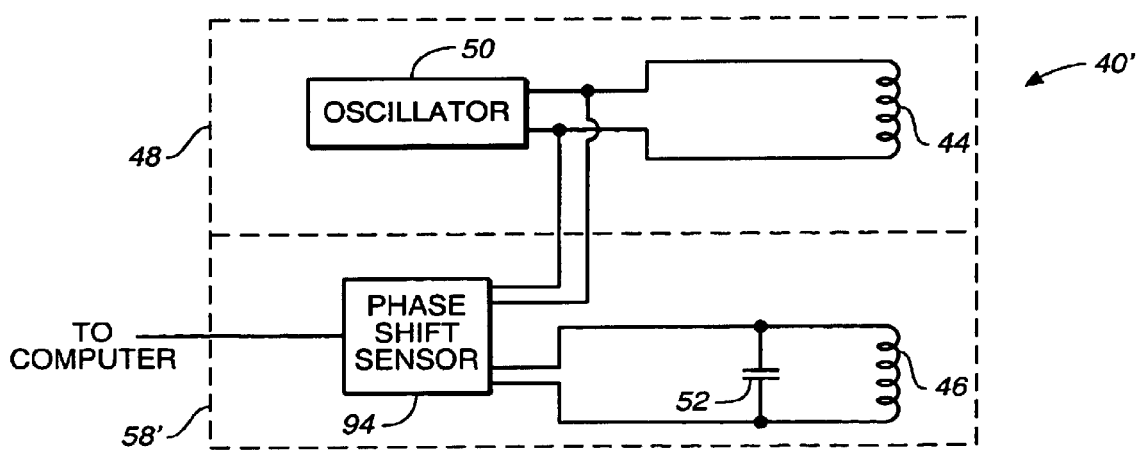
FIG._9

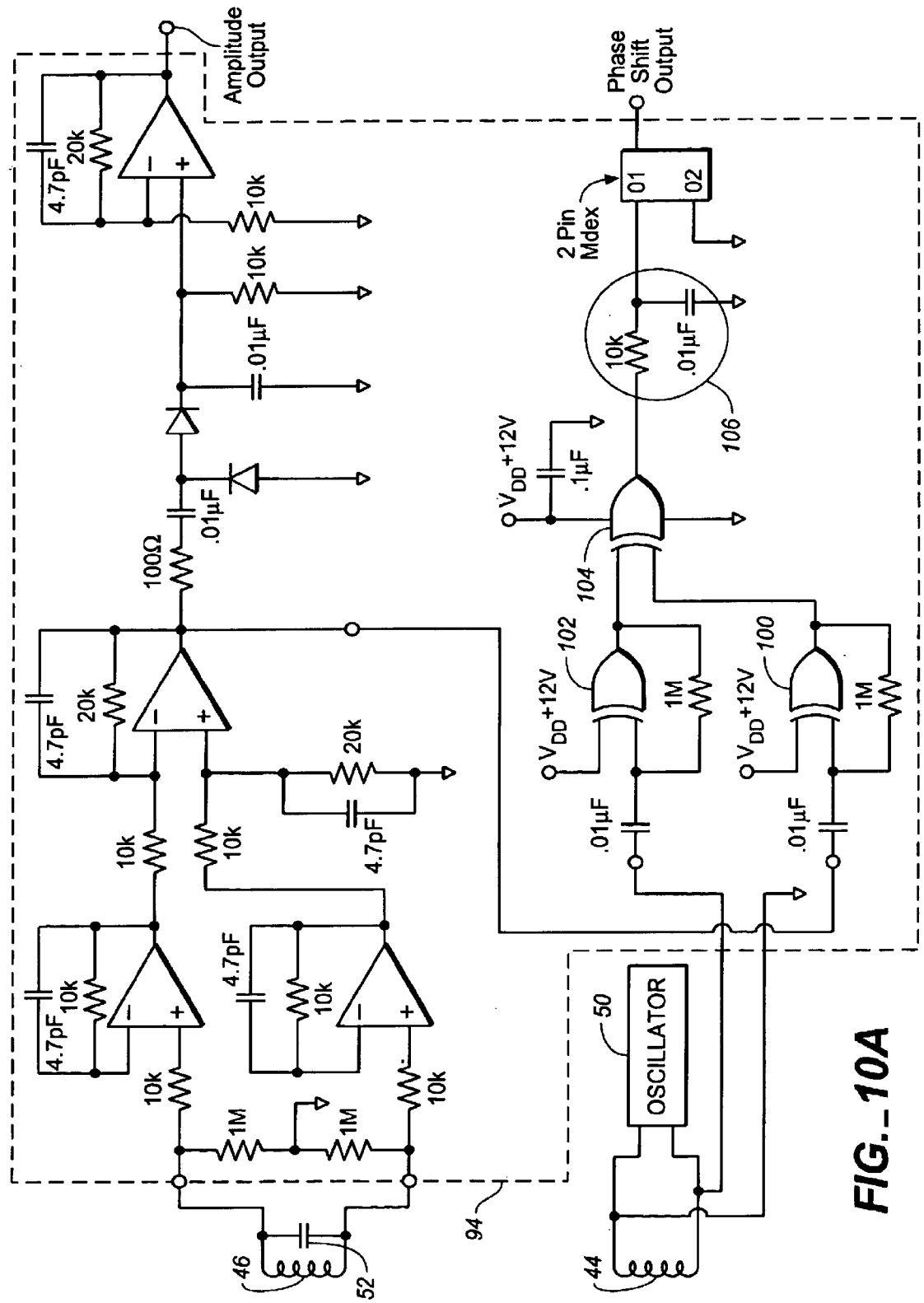
FIG._10A

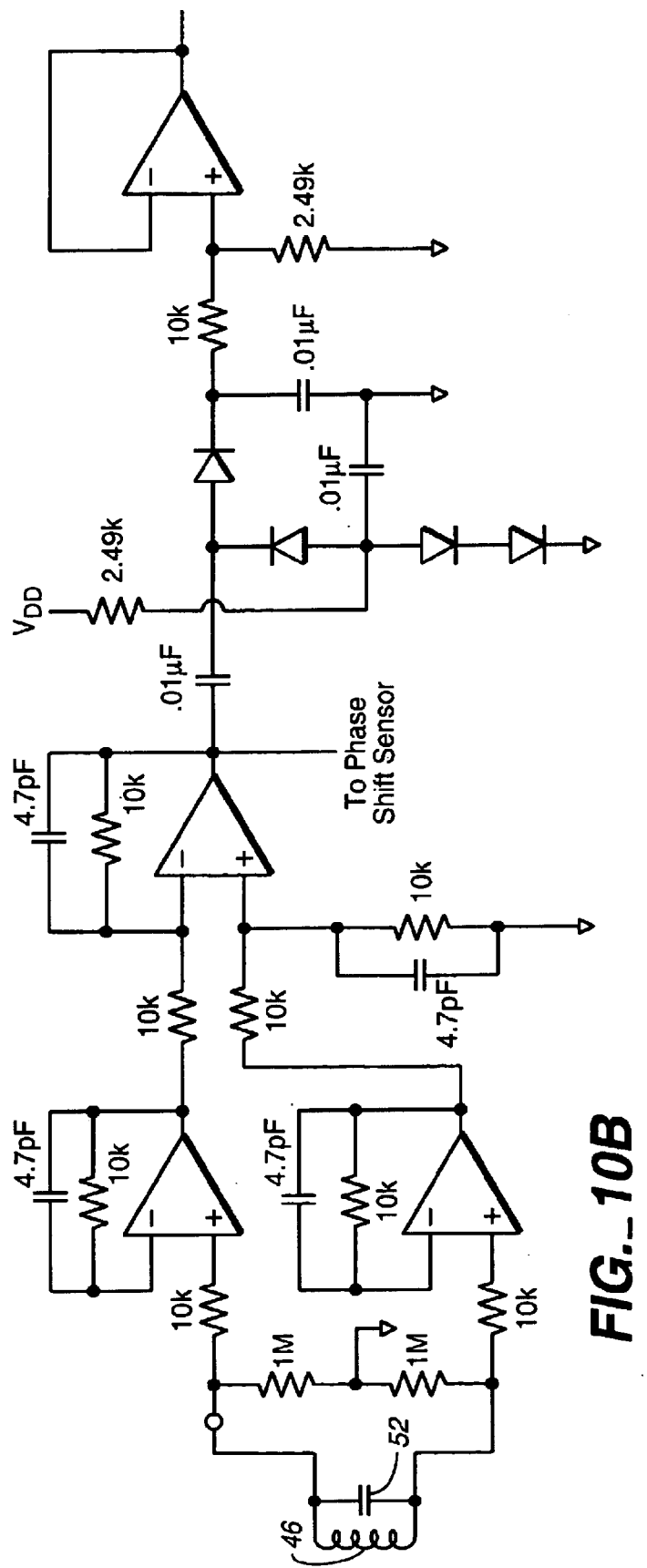
FIG._10B

EDDY CURRENT SENSING OF METAL REMOVAL FOR CHEMICAL MECHANICAL POLISHING

CROSS-REFERENCE TO RELATED APPLICATIONS

This application is a divisional application of and claims priority under 35 USC 120 to U.S. application Ser. No. 09/574,008, filed on May 19, 2000 now U.S. Pat. No. 6,924,641, the entire disclosure of which is incorporated herein by reference.

BACKGROUND

The present invention relates generally to chemical mechanical polishing of substrates, and more particularly to methods and apparatus for monitoring a metal layer during chemical mechanical polishing.

An integrated circuit is typically formed on a substrate by the sequential deposition of conductive, semiconductive or insulative layers on a silicon wafer. One fabrication step involves depositing a filler layer over a non-planar surface, and planarizing the filler layer until the non-planar surface is exposed. For example, a conductive filler layer can be deposited on a patterned insulative layer to fill the trenches or holes in the insulative layer. The filler layer is then polished until the raised pattern of the insulative layer is exposed. After planarization, the portions of the conductive layer remaining between the raised pattern of the insulative layer form vias, plugs and lines that provide conductive paths between thin film circuits on the substrate. In addition, planarization is needed to planarize the substrate surface for photolithography.

Chemical mechanical polishing (CMP) is one accepted method of planarization. This planarization method typically requires that the substrate be mounted on a carrier or polishing head. The exposed surface of the substrate is placed against a rotating polishing disk pad or belt pad. The polishing pad can be either a "standard" pad or a fixed-abrasive pad. A standard pad has a durable roughened surface, whereas a fixed-abrasive pad has abrasive particles held in a containment media. The carrier head provides a controllable load on the substrate to push it against the polishing pad. A polishing slurry, including at least one chemically-reactive agent, and abrasive particles if a standard pad is used, is supplied to the surface of the polishing pad.

One problem in CMP is determining whether the polishing process is complete, i.e., whether a substrate layer has been planarized to a desired flatness or thickness, or when a desired amount of material has been removed. Overpolishing (removing too much) of a conductive layer or film leads to increased circuit resistance. On the other hand, underpolishing (removing too little) of a conductive layer leads to electrical shorting. Variations in the initial thickness of the substrate layer, the slurry composition, the polishing pad condition, the relative speed between the polishing pad and the substrate, and the load on the substrate can cause variations in the material removal rate. These variations cause variations in the time needed to reach the polishing endpoint. Therefore, the polishing endpoint cannot be determined merely as a function of polishing time.

One way to determine the polishing endpoint is to remove the substrate from the polishing surface and examine it. For example, the substrate can be transferred to a metrology station where the thickness of a substrate layer is measured, e.g., with a profilometer or a resistivity measurement. If the desired specifications are not met, the substrate is reloaded into the CMP apparatus for further processing. This is a time-consuming procedure that reduces the throughput of the CMP apparatus. Alternatively, the examination might reveal that an excessive amount of material has been removed, rendering the substrate unusable.

More recently, in-situ monitoring of the substrate has been performed, e.g., with optical or capacitance sensors, in order to detect the polishing endpoint. Other proposed endpoint detection techniques have involved measurements of friction, motor current, slurry chemistry, acoustics and conductivity. One detection technique that has been considered is to induce an eddy current in the metal layer and measure the change in the eddy current as the metal layer is removed. Unfortunately, the proposed eddy current sensing techniques typically require complex electronics. In addition, the sensors are positioned on the backside of the substrate. Since the magnetic field of the sensor extends toward the platen, special shielding is needed to prevent the metal platen from interfering with the eddy current measurements.

SUMMARY

In one aspect, the invention is directed to a sensor for monitoring a conductive film in a substrate. The sensor has a core positionable in proximity to the substrate, a first coil wound around a first portion of the core, an oscillator electrically coupled to the first coil to induce an alternating current in the first coil and generate an alternating magnetic field in proximity to the substrate, and a second coil wound around a second portion of the core. A capacitor is electrically coupled to the second coil, and an amplifier is electrically coupled to the second coil and the capacitor to generate an output signal.

Implementations of the invention may include one or more of the following features. The oscillator may induce an alternating current with a frequency selected to provide a resonant frequency when the substrate is not in proximity to the core. The core may consists essentially of ferrite, and may includes two prongs and a connecting portion between the two prongs. The first coil may be wound around the connecting portion, and the second coil may be wound around at least one of the two prongs. The second coil and the capacitor may be connected in parallel. The sensor may be positioned on a side of a polishing pad opposite the substrate. The polishing pad may includes an upper layer and a lower layer, and an aperture may be formed in at least a portion of the lower layer adjacent the core. A computer may receive the output signal.

In another aspect, the invention is directed to a chemical mechanical polishing apparatus. The apparatus has a polishing pad, a carrier to hold a substrate against a first side of the polishing surface, an eddy current sensor, and a motor coupled to at least one of the polishing pad and carrier head for generating relative motion therebetween. The sensor includes at least one inductor positioned on a second side of the polishing pad opposite the substrate, an oscillator electrically coupled to the at least one inductor to induce an alternating current in the coil and generate an alternating magnetic field, and a capacitor electrically coupled to the at least one inductor.

Implementations of the invention may include one or more of the following features. A platen may support the polishing pad, and the at least one inductor may be positioned in a recess in a top surface of the platen. The platen may rotates, and a position sensor may determine an angular position of the platen and a controller to sample data from the eddy current sensor when the at least one inductor is positioned adjacent the substrate. A recess may be formed in the second side of the polishing pad. The polishing pad may include a cover layer on the first side of the polishing pad and a backing layer on the second side of the polishing pad, and the recess may be formed by removing a portion of the backing layer. The eddy current sensor may include a core having two poles positioned adjacent the recess in the polishing pad, and the at least one inductor is wound around a first portion of the core. The eddy current sensor may include a core, and the at least one inductor may include a first inductor wound around a first portion of the core and a second inductor wound around a second portion of the core. The oscillator may be electrically coupled to the first coil to induce an alternating current in the first coil. The capacitor may be electrically coupled to the second coil. The oscillator may induce an alternating current with a frequency selected to provide a resonant frequency when the substrate is not in proximity to the core. An endpoint detection system may receive an output signal from the eddy current sensor. The endpoint detection system may be configured to signal a polishing endpoint if the output signal exceeds a predetermined threshold.

In another aspect, the invention may be directed to a method of monitoring a thickness of a conductive layer in a substrate during a polishing operation. In the method, a substrate is positioned on a first side of a polishing surface, and an alternating magnetic field is generated from an inductor positioned on a second side of the polishing surface opposite the substrate. The magnetic field extends through the polishing surface to induce eddy currents in the conductive layer. A change in the alternating magnetic field caused by a change in the thickness of the conductive layer is detected.

Implementations of the invention may include one or more of the following features A first coil may be driven with an oscillator at a first frequency. The first frequency may be a resonant frequency when the substrate is not in proximity to the magnetic field. The alternating magnetic field may be sensed with a second coil. The second coil may be connected in parallel with a capacitor. The first coil may be wound around a first portion of a core, and the second coil may be wound around a second portion of the core. When the inductor is adjacent the substrate may be determined. The inductor may be driven with a first signal, and a second signal may be generated from the alternating magnetic field. A change in amplitude in the second signal may be determined. A change in a phase difference between the first signal and the second signal may be determined.

In another aspect, the invention is directed to a method of chemical mechanical polishing. In the method, a substrate having a conductive layer is positioned on a first side of a polishing surface. An alternating magnetic field is generated from an inductor positioned on a second side of the polishing surface opposite the substrate. The magnetic field extends through the polishing surface to induce eddy currents in the conductive layer. Relative motion is created between the substrate and the polishing surface to polish the conductive layer. The eddy currents in the substrate are sensed, and polishing is halted when the sensed eddy currents exhibit an endpoint criteria.

Implementations of the invention may include one or more of the following features. The endpoint criteria may be the eddy currents passing a threshold strength or leveling off.

In another aspect, the invention is directed to a chemical mechanical polishing apparatus. The apparatus has a polishing pad with a polishing surface, a carrier to hold a substrate against the polishing surface, a motor coupled to at least one of the polishing pad and carrier head for generating relative motion therebetween, and a conductive layer thickness monitoring system. The conductive layer thickness monitoring system including at least one inductor, a current source that generates a drive signal, the current source electrically coupled to the at least one inductor to induce an alternating current in the at least one inductor and generate an alternating magnetic field, sense circuitry including a capacitor electrically coupled to the at least one inductor to sense the alternating magnetic field and generate a sense signal, and phase comparison circuitry coupled to the current source and the sense circuitry to measure a phase difference between the sense signal and the drive signal.

Implementations of the invention may include one or more of the following features. At least one first gate, e.g., an XOR gate, may convert sinusoidal signals from the inductor and the oscillator into first and second square-wave signals. A comparator, e.g., an XOR gate, may compare the first square-wave signal to the second square-wave signal to generate a third square-wave signal. A filter may convert the third square-wave signal into differential signal having an amplitude proportional to the phase difference between the first and second square wave signals. The phase comparison circuitry may generate a signal with a duty cycle proportional to the phase difference.

In another aspect, the invention may be directed to a method of monitoring a thickness of a conductive layer on a substrate during a chemical mechanical polishing operation. In the method, a coil is energized with a first signal to generate an alternating magnetic field. The alternating magnetic field induces eddy currents in a conductive layer of the substrate. The alternating magnetic field is measured and a second signal is generated indicative of the magnetic field. Te first and second signals are compared to determine a phase difference therebetween.

Implementations of the invention can include zero or more of the following possible advantages. The endpoint detector can sense the polishing endpoint of a metal layer in-situ. The magnetic field apparatus for the endpoint detector can be embedded in the platen below a polishing pad. The magnetic field apparatus can be protected from polishing environment, e.g., corrosive slurry. The endpoint detector need not use complex electronics. Polishing can be stopped with reasonable accuracy. Overpolishing and underpolishing substrate can be reduced, thereby improving yield and throughput.

Other features and advantages of the invention will become apparent from the following description, including the drawings and claims.

BRIEF DESCRIPTION OF THE DRAWINGS

FIG. 1 is a schematic exploded perspective view of a chemical mechanical polishing apparatus.

FIG. 2 is a schematic side view, partially cross-sectional, of a chemical mechanical polishing apparatus including an eddy current monitoring system.

FIG. 3 is a schematic circuit diagram of the eddy current monitoring system.

FIGS. 4A–4C are schematic cross-sectional views of a polishing pad.

FIG. 5 is a schematic cross-sectional view illustrating a magnetic field generated by the monitoring system.

FIG. 6 is a schematic perspective view of a core from an eddy current sensor.

FIGS. 7A–7D schematically illustrating a method of detecting a polishing endpoint using an eddy current sensor.

FIG. 8 is a graph illustrating a trace from the eddy current monitoring system.

FIG. 9 is a schematic diagrams an eddy current monitoring system that senses a phase shift.

FIGS. 10A and 10B are schematic circuit diagrams of two implementations of an eddy current monitoring system of FIG. 9.

FIG. 11 is a graph illustrating a trace from the eddy current monitoring system that measures phase shift.

DETAILED DESCRIPTION

Referring to FIGS. 1 and 2A, one or more substrates 10 can be polished by a CMP apparatus 20. A description of a similar polishing apparatus 20 can be found in U.S. Pat. No. 5,738,574, the entire disclosure of which is incorporated herein by reference. Polishing apparatus 20 includes a series of polishing stations 22 and a transfer station 23. Transfer station 23 transfers the substrates between the carrier heads and a loading apparatus.

Each polishing station includes a rotatable platen 24 on which is placed a polishing pad 30. The first and second stations can include a two-layer polishing pad with a hard durable outer surface or a fixed-abrasive pad with embedded abrasive particles. The final polishing station can include a relatively soft pad. Each polishing station can also include a pad conditioner apparatus 28 to maintain the condition of the polishing pad so that it will effectively polish substrates.

A two-layer polishing pad 30 typically has a backing layer 32 which abuts the surface of platen 24 and a covering layer 34 which is used to polish substrate 10. Covering layer 34 is typically harder than backing layer 32. However, some pads have only a covering layer and no backing layer. Covering layer 34 can be composed of foamed or cast polyurethane, possibly with fillers, e.g., hollow microspheres, and/or a grooved surface. Backing layer 32 can be composed of compressed felt fibers leached with urethane. A two-layer polishing pad, with the covering layer composed of IC-1000 and the backing layer composed of SUBA-4, is available from Rodel, Inc., of Newark, Del. (IC-1000 and SUBA-4 are product names of Rodel, Inc.).

A rotatable multi-head carousel 60 supports four carrier heads 70. The carousel is rotated by a central post 62 about a carousel axis 64 by a carousel motor assembly (not shown) to orbit the carrier head systems and the substrates attached thereto between polishing stations 22 and transfer station 23. Three of the carrier head systems receive and hold substrates, and polish them by pressing them against the polishing pads. Meanwhile, one of the carrier head systems receives a substrate from and delivers a substrate to transfer station 23.

Each carrier head 70 is connected by a carrier drive shaft 74 to a carrier head rotation motor 76 (shown by the removal of one quarter of cover 68) so that each carrier head can independently rotate about its own axis. In addition, each carrier head 70 independently laterally oscillates in a radial slot 72 formed in carousel support plate 66. A description of a suitable carrier head 70 can be found in U.S. Pat. No. 6,422,972, filed Dec. 23, 1999, the entire disclosure of which is incorporated by reference. In operation, the platen is rotated about its central axis 25 using a platen motor 255, which may include one or more encoders 257 for determining a position of platen 24, and the carrier head is rotated about its central axis 71 and translated laterally across the surface of the polishing pad.

A slurry 38 containing a reactive agent (e.g., deionized water for oxide polishing) and a chemically-reactive catalyzer (e.g., potassium hydroxide for oxide polishing) can be supplied to the surface of polishing pad 30 by a slurry supply port or combined slurry/rinse arm 39. If polishing pad 30 is a standard pad, slurry 38 can also include abrasive particles (e.g., silicon dioxide for oxide polishing).

Referring to FIGS. 2A and 3, a recess 26 is formed in platen 24, and a thin section 36 can be formed in polishing pad 30 overlying recess 26. Aperture 26 and thin pad section 36, if needed, are positioned such that they pass beneath substrate 10 during a portion of the platen's rotation, regardless of the translational position of the carrier head. Assuming that polishing pad 32 is a two-layer pad, thin pad section 36 can be constructed as shown in FIG. 4A by removing a portion 33 of backing layer 32. Alternatively, as shown in FIG. 4B, thin pad section 36' can be formed by removing a portion 33' of both backing layer 32' and a portion of cover layer 34'. Thus, this implementation has a recess in the bottom surface of cover layer 34 in the thin pad section 36. If the polishing pad is a single-layer pad, thin pad section 36 can be formed by removing a portion of the pad material to create a recess in the bottom surface of the pad. Alternatively, as shown in FIG. 4C, thin pad section 36" can be formed by inserting a plug 37 of a different material into polishing pad 30. For example, the plug can be a relatively pure polymer or polyurethane, e.g., formed without fillers. In general, the material of pad section 36 should be non-magnetic and non-conductive. If the polishing pad is itself sufficiently thin or has a magnet permeability (and conductivity) that does not interfere with the eddy current measurements, then the pad does not need any modifications or recesses.

Returning to FIGS. 2A and 3, an in-situ eddy current monitoring system 40, which can function as an endpoint detector, includes a drive system 48 to induce eddy currents in a metal layer on the substrate and a sensing system 58 to detect eddy currents induced in the metal layer by the drive system. The monitoring system 40 includes a core 42 positioned in recess 26 to rotate with the platen, a drive coil 44 wound around one part of core 42, and a sense coil 46 wound around second part of core 42. For drive system 48, monitoring system 40 includes an oscillator 50 connected to drive coil 44. For sense system 58, monitoring system 40 includes a capacitor 52 connected in parallel with sense coil 46, an RF amplifier 54 connected to sense coil 46, and a diode 56. The oscillator 50, capacitor 52, RF amplifier 54, and diode 56 can be located apart from platen 24, and can be coupled to the components in the platen through a rotary electrical union 29.

Referring to FIG. 5, in operation the oscillator 50 drives drive coil 44 to generate an oscillating magnetic field 48 that extends through the body of core 42 and into the gap 46 between the two poles 42a and 42b of the core. At least a portion of magnetic field 48 extends through thin portion 36 of polishing pad 30 and into substrate 10. If a metal layer 12 is present on substrate 10, oscillating magnetic field 48 generates eddy currents in the metal layer 12. The eddy currents cause the metal layer 12 to act as an impedance source in parallel with sense coil 46 and capacitor 52. As the thickness of the metal layer changes, the impedance changes, resulting in a change in the Q-factor of sensing mechanism. By detecting the change in the Q-factor of the sensing mechanism, the eddy current sensor can sense the change in the strength of the eddy currents, and thus the change in thickness of metal layer 12.

Referring to FIG. 6, core 42 can be a U-shaped body formed of a non-conductive material with a relatively high magnetic permeability (e.g., $\mu$ of about 2500). Specifically, core 42 can be ferrite. In one implementation, the two poles 42a and 42b are about 0.6 inches apart, the core is about 0.6 inches deep, and the cross-section of the core is a square about 0.2 inches on a side.

In general, the in-situ eddy current monitoring system 40 is constructed with a resonant frequency of about 50 kHz to 10 MHz, e.g., 2 MHz. For example, the sense coil 46 can have an inductance of about 0.3 to 30 $\mu$H and the capacitor 52 can have a capacitance of about 0.2 to 20 nF. The driving coil can be designed to match the driving signal from the oscillator. For example, if the oscillator has a low voltage and a low impedance, the drive coil can include fewer turns to provide a small inductance. On the other hand, if the oscillator has a high voltage and a high impedance, the drive coil can include more turns to provide a large inductance.

In one implementation, the sense coil 46 includes nine turns around each prong of the core, and the drive coil 44 includes two turns around the base of the core, and the oscillator drives the drive coil 44 with an amplitude of about 0.1 V to 5.0 V. Also, in one implementation, the sense coil 46 has an inductance of about 2.8 $\mu$H, the capacitor 52 has a capacitance of about 2.2 nF, and the resonant frequency is about 2 MHz. In another implementation, the sense coil has an inductance of about 3 $\mu$H and the capacitor 52 has a capacitance of about 400 pF. Of course, these values are merely exemplary, as they are highly sensitive to the exact winding configuration, core composition and shape, and capacitor size.

In general, the greater the expected initial thickness of the conductive film, the lower the desired resonant frequency. For example, for a relatively thin film, e.g., 2000 Angstroms, the capacitance and inductance can be selected to provide a relatively high resonant frequency, e.g., about 2 MHz. On the other hand, for a relatively thicker film, e.g., 20000 Angstroms, the capacitance and inductance can be selected to provide a relatively lower resonant frequency, e.g., about 50 kHz. However, high resonant frequencies may still work well with thick copper layers. In addition, very high frequencies (above 2 MHz) can be used to reduce background noise from metal parts in the carrier head.

Returning to FIGS. 2A, 2B and 3, the CMP apparatus 20 can also include a position sensor 80, such as an optical interrupter, to sense when core 42 is beneath substrate 10. For example, the optical interrupter could be mounted at a fixed point opposite carrier head 70. A flag 82 is attached to the periphery of the platen. The point of attachment and length of flag 82 is selected so that it interrupts the optical signal of sensor 80 while core 42 sweeps beneath substrate 10. Alternately, the CMP apparatus can include an encoder to determine the angular position of platen In operation, CMP apparatus 20 uses monitoring system 40 to determine when the bulk of the filler layer has been removed and the underlying stop layer has been exposed. Monitoring system 40 can as be used to determine the amount of material removed from the surface of the substrate. A general purpose programmable digital computer 90 can be connected to amplifier 56 to receive the intensity signal from the eddy current sensing system. Computer 90 can be programmed to sample amplitude measurements from the monitoring system when the substrate generally overlies the core, to store the amplitude measurements, and to apply the endpoint detection logic to the measured signals to detect the polishing endpoint. Possible endpoint criteria for the detector logic include local minima or maxima, changes in slope, threshold values in amplitude or slope, or combinations thereof.

Referring to FIG. 2B, the core 42, drive coil 44 and sense coil 46 of the eddy current sensor located below thin section 36 of polishing pad 32 sweep beneath the substrate with each rotation of the platen. Therefore, the computer 90 can also be programmed to divide the amplitude measurements from each sweep of the core beneath the substrate into a plurality of sampling zones 96, to calculate the radial position of each sampling zone, to sort the amplitude measurements into radial ranges, to determine minimum, maximum and average amplitude measurements for each sampling zone, and to use multiple radial ranges to determine the polishing endpoint, as discussed in U.S. patent application Ser. No. 09/460,529, filed Dec. 13, 1999, the entirety of which is incorporated herein by reference.

Since the eddy current sensor sweeps beneath the substrate with each rotation of the platen, information on the metal layer thickness is being accumulated in-situ and on a continuous real-time basis. In fact, the amplitude measurements from the eddy current sensor can be displayed on an output device 92 during polishing to permit the operator of the device to visually monitor the progress of the polishing operation.

Moreover, after sorting the amplitude measurements into radial ranges, information on the metal film thickness can be fed in real-time into a closed-loop controller to periodically or continuously modify the polishing pressure profile applied by a carrier head, as discussed in U.S. patent application Ser. No. 60/143,219, filed Jul. 7, 1999, the entirety of which is incorporated herein by reference. For example, the computer could determine that the endpoint criteria have been satisfied for the outer radial ranges but not for the inner radial ranges. This would indicate that the underlying layer has been exposed in an annular outer area but not in an inner area of the substrate. In this case, the computer could reduce the diameter of the area in which pressure is applied so that pressure is applied only to the inner area of the substrate, thereby reducing dishing and erosion on the outer area of the substrate. Alternatively, the computer can halt polishing of the substrate on the first indication that the underlying layer has been exposed anywhere on the substrate, i.e., at first clearing of the metal layer.

Initially, referring to FIGS. 2A, 3 and 7A, oscillator 50 is tuned to the resonant frequency of the LC circuit, without any substrate present. This resonant frequency results in the maximum amplitude of the output signal from RF amplifier 54.

As shown in FIGS. 7B and 8, for a polishing operation, a substrate 10 is placed in contact with polishing pad 30. Substrate 10 can include a silicon wafer 12 and a conductive layer 16, e.g., a metal such as copper, disposed over one or more patterned underlying layers 14, which can be semiconductor, conductor or insulator layers. The patterned underlying layers can include metal features, e.g., vias, pads and interconnects. Since, prior to polishing, the bulk of conductive layer 16 is initially relatively thick and continuous, it has a low resistivity, and relatively strong eddy currents can be generated in the conductive layer. As previously mentioned, the eddy currents cause the metal layer to function as an impedance source in parallel with sense coil 46 and capacitor 52. Consequently, the presence of conductive film 16 reduces the Q-factor of the sensor circuit, thereby significantly reducing the amplitude of the signal from RF amplifier 56.

Referring to FIGS. 7C and 8, as substrate 10 is polished, the bulk portion of conductive layer 16 is thinned. As the conductive layer 16 thins, its sheet resistivity increases, and the eddy currents in the metal layer become dampened.

Consequently, the coupling between metal layer 16 and sensor circuitry 58 is reduced (i.e., increasing the resistivity of the virtual impedance source). As the coupling declines, the Q-factor of the sensor circuit 58 increases toward its original value.

Referring to FIGS. 7D and 8, eventually the bulk portion of conductive layer 16 is removed, leaving conductive interconnects 16' in the trenches between the patterned insulative layer 14. At this points, the coupling between the conductive portions in the substrate, which are generally small and generally non-continuous, and sensor circuit 58 reaches a minimum. Consequently, the Q-factor of the sensor circuit reaches a maximum value (although not as large as the Q-factor when the substrate is entirely absent). This causes the amplitude of the output signal from the sensor circuit to plateau. Thus, by sensing when the amplitude of the output signal is no longer increasing and has leveled off (e.g., reached a local plateau), computer 90 can sense a polishing endpoint. Alternatively, by polishing one or more test substrates, the operator of the polishing machine can determine the amplitude of the output signal as a function of the thickness of the metal layer. Thus, the endpoint detector can halt polishing when a particular thickness of the metal layer remains on the substrate. Specifically, computer 90 can trigger the endpoint when the output signal from the amplifier exceeds a voltage threshold corresponding to the desired thickness.

The eddy current monitoring system can also be used to trigger a change in polishing parameters. For example, when the monitoring system detects a polishing criterion, the CMP apparatus can change the slurry composition (e.g., from a high-selectivity slurry to a low selectivity slurry). As another example, as discussed above, the CMP apparatus can change the pressure profile applied by the carrier head.

In addition to sensing changes in amplitude, the eddy current monitoring system can calculate a phase shift in the sensed signal. As the metal layer is polished, the phase of the sensed signal changes relative to the drive signal from the oscillator 50. This phase difference can be correlated to the thickness of the polished layer. One implementation of a phase measuring device, shown in FIG. 10A, combines the drive and sense signals to generate a phase shift signal with a pulse width or duty cycle which is proportional to the phase difference. In this implementation, two XOR gates 100 and 102 are used to convert sinusoidal signals from the sense coil 46 and oscillator 50, respectively, into square-wave signals. The two square-wave signals are fed into the inputs of a third XOR gate 104. The output of the third XOR gate 104 is a phase shift signal with a pulse width or duty cycle proportional to the phase difference between the two square wave signals. The phase shift signal is filtered by an RC filter 106 to generate a DC-like signal with a voltage proportional to the phase difference. Alternatively, the signals can be fed into a programmable digital logic, e.g., a Complex Programmable Logic Device (CPLD) or Field Programmable Gate Array (FGPA) that performs the phase shift measurements.

The phase shift measurement can be used to detect the polishing endpoint in the same fashion as the amplitude measurements discussed above. Alternatively, both amplitude and phase shift measurements could be used in the endpoint detection algorithm. An implementation for both the amplitude and phase shift portions of the eddy current monitoring system is shown in FIG. 10A. An implementation of the amplitude sensing portion of the eddy current monitoring system is shown in FIG. 10B. An example of a trace generated by an eddy current monitoring system that measures the phase difference between the drive and sense signals is shown in FIG. 11. Since the phase measurements are highly sensitive to the stability of the driving frequency, phase locked loop electronics may be added.

A possible advantage of the phase difference measurement is that the dependence of the phase difference on the metal layer thickness may be more linear than that of the amplitude. In addition, the absolute thickness of the metal layer may be determined over a wide range of possible thicknesses.

The eddy current monitoring system can be used in a variety of polishing systems. Either the polishing pad, or the carrier head, or both can move to provide relative motion between the polishing surface and the substrate. The polishing pad can be a circular (or some other shape) pad secured to the platen, a tape extending between supply and take-up rollers, or a continuous belt. The polishing pad can be affixed on a platen, incrementally advanced over a platen between polishing operations, or driven continuously over the platen during polishing. The pad can be secured to the platen during polishing, or there could be a fluid bearing between the platen and polishing pad during polishing. The polishing pad can be a standard (e.g., polyurethane with or without fillers) rough pad, a soft pad, or a fixed-abrasive pad. Rather than tuning when the substrate is absent, the drive frequency of the oscillator can be tuned to a resonant frequency with a polished or unpolished substrate present (with or without the carrier head), or to some other reference.

Various aspects of the invention, such as placement of the coil on a side of the polishing surface opposite the substrate or the measurement of a phase difference, still apply if the eddy current sensor uses a single coil. In a single coil system, both the oscillator and the sense capacitor (and other sensor circuitry) are connected to the same coil.

The present invention has been described in terms of a preferred embodiment. The invention, however, is not limited to the embodiment depicted and described. Rather, the scope of the invention is defined by the appended claims.

What is claimed is:

1. A method of monitoring a thickness of a conductive layer in a substrate during a polishing operation, comprising:
    positioning the substrate on a first side of a polishing surface of a pad;
    generating an alternating magnetic field from an inductor positioned on a second side of the polishing surface opposite the substrate, the magnetic field extending through the polishing surface to induce eddy currents in the conductive layer;
    detecting a change in the alternating magnetic field caused by a change in the thickness of the conductive layer; and
    detecting information indicative of a position of the substrate with respect to the inductor, wherein said detecting information indicative of a position of the substrate with respect to the inductor comprises determining when the inductor is adjacent the substrate using at least one of an optical interrupter and an encoder.

2. The method of claim 1, wherein generating the alternating magnetic field from an inductor includes driving a first coil with an oscillator at a first frequency.

3. The method of claim 2, wherein the first frequency is a resonant frequency when the substrate is not in proximity to the magnetic field.

4. The method of claim 2, wherein detecting a change in the alternating magnetic field includes sensing the alternating magnetic field with a second coil.

5. The method of claim 4, wherein the second coil is connected in parallel with a capacitor.

6. The method of claim 4, wherein the first coil is wound around a first portion of a core and the second coil is wound around a second portion of the core.

7. The method of claim 1, wherein generating an alternating magnetic field from an inductor includes driving the inductor with a first signal, and detecting a change in the alternating magnetic field includes generating a second signal from the alternating magnetic field.

8. The method of claim 7, further comprising determining a change in amplitude in the second signal.

9. The method of claim 7, further comprising determining a change in a phase difference between the first signal and the second signal.

10. A method of chemical mechanical polishing comprising:

positioning a substrate having a conductive layer on a first side of a polishing surface of a pad;

generating an alternating magnetic field from an inductor positioned on a second side of the polishing surface opposite the substrate, the magnetic field extending through the polishing surface to induce eddy currents in the conductive layer;

creating relative motion between the substrate and the polishing surface to polish the conductive layer;

sensing the eddy currents in the substrate; and halting polishing when the sensed eddy currents exhibit one or more endpoint criteria based on a slope-related parameter of the eddy current signal.

11. The method of claim 10, wherein the slope-related parameter is indicative of the slope of the eddy current signal passing a threshold value.

12. The method of claim 10, wherein the slope-related parameter is indicative of the slope of the eddy current signal leveling off.

13. The method of claim 10, wherein the slope-related parameter is indicative of a change in slope of the eddy current signal.

14. The method of claim 10, wherein the slope-related parameter is indicative of a local minima or local maxima of the eddy current signal.

* * * * *

UNITED STATES PATENT AND TRADEMARK OFFICE
CERTIFICATE OF CORRECTION

| | | |
|---|---|---|
| PATENT NO. | : 6,975,107 B2 | Page 1 of 1 |
| APPLICATION NO. | : 10/446367 | |
| DATED | : December 13, 2005 | |
| INVENTOR(S) | : Hiroji Hanawa et al. | |

It is certified that error appears in the above-identified patent and that said Letters Patent is hereby corrected as shown below:

On the Title Page, item (54);and Col., Line 1 replace:
"EDDY CURRENT SENSING OF METAL REMOVAL FOR CHEMICAL MECHANICAL POLISHING" with

--METHOD FOR MONITORING A METAL LAYER DURING CHEMICAL MECHANICAL POLISHING--

Column 10, Line 56, Claim 1; replace:
"inductor is adjacent the substrate" with
--inductor is adjacent to the substrate--

Signed and Sealed this

Nineteenth Day of December, 2006

JON W. DUDAS
*Director of the United States Patent and Trademark Office*